US006336036B1

(12) United States Patent
Hayes

(10) Patent No.: US 6,336,036 B1
(45) Date of Patent: Jan. 1, 2002

(54) RETRACTABLE DUAL-BAND TAPPED HELICAL RADIOTELEPHONE ANTENNAS

(75) Inventor: Gerard James Hayes, Wake Forest, NC (US)

(73) Assignee: Ericsson Inc., Research Triangle Park, NC (US)

(*) Notice: Subject to any disclaimer, the term of this patent is extended or adjusted under 35 U.S.C. 154(b) by 0 days.

(21) Appl. No.: 09/111,496

(22) Filed: Jul. 8, 1998

(51) Int. Cl.[7] .................................................. H04B 1/38

(52) U.S. Cl. ........................ 455/550; 455/562; 455/575

(58) Field of Search .......................... 455/90, 550, 575, 455/347, 128, 129, 121, 562; 343/702, 790

(56) References Cited

U.S. PATENT DOCUMENTS 4,121,218 A 10/1978 Irwin et al.
4,163,981 A * 8/1979 Wilson ....................... 343/715
4,442,438 A 4/1984 Siwiak et al.
4,494,122 A 1/1985 Garay et al.
4,554,554 A 11/1985 Olesen et al.
4,800,395 A 1/1989 Balzano et al.
5,504,494 A 4/1996 Chatzipetros et al.
5,754,146 A 5/1998 Knowles et al.
5,852,421 A * 12/1998 Maldonado ................. 343/702
5,880,696 A * 3/1999 Koleda ....................... 343/702
5,923,305 A * 7/1999 Sadler et al. ............... 343/895
5,945,953 A * 8/1999 Tsuda et al. ................ 343/702
5,963,871 A * 10/1999 Zhining et al. ............. 455/550
5,982,330 A * 11/1999 Koyanagi et al. ........... 343/702
5,999,133 A * 12/1999 Svensson .................... 343/702
6,008,765 A * 12/1999 Davidson et al. ........... 343/702
6,097,934 A * 8/2000 Spall et al. .................... 455/90
6,140,973 A * 10/2000 Annamaa et al. ........... 343/790

FOREIGN PATENT DOCUMENTS

EP 0 613 206 A1 8/1994
EP 0 613 207 A1 8/1994
EP 0634 806 A1 1/1995
EP 0 635 898 1/1995
EP 0 649 181 4/1995
EP 0 718 909 A2 6/1996
EP 0 734 092 A1 9/1996
EP 0 790 666 8/1997
EP 0 855 759 A2 7/1998
JP 5-136623 6/1993
JP 6-37531 2/1994
WO 96/34425 10/1996
WO 97/11507 3/1997
WO 98/10485 3/1998
WO WO 98/15028 4/1998

* cited by examiner

*Primary Examiner*—Daniel Hunter
*Assistant Examiner*—C. Chow
(74) *Attorney, Agent, or Firm*—Myers Bigel Sibley & Sajovec

(57) ABSTRACT

Radiotelephones having retractable antenna systems are disclosed which include a helix antenna coupled to an extendible rod antenna. When the rod antenna is in the retracted position, the rod antenna is mostly, or completely, located within the housing of the radiotelephone, whereas when the radiotelephone operates with the rod antenna in the extended position, most, or all, of the rod antenna is pulled outside of the housing, thereby extending the helix antenna well away from the body of the radiotelephone. The antennas are configured to provide a ¼ wavelength electrical length when retracted and a ½ wavelength electrical length when extended in the low frequency (such as AMPS) band. A matching circuit is provided using known techniques to provide a selected impedence in the extended position. The tap point where the helical antenna is connected to the rod antenna is intermediate the ends of the helical antenna and is selected to provide a desired impedence in the high frequency (such as PCS) band.

28 Claims, 4 Drawing Sheets

RETRACTABLE DUAL-BAND TAPPED HELICAL RADIOTELEPHONE ANTENNAS

FIELD OF THE INVENTION

The present invention relates generally to radiotelephones, and, more particularly, to retractable antenna systems for use with portable radiotelephones.

BACKGROUND OF THE INVENTION

Radiotelephones, which are well known in the art, generally refer to communications terminals which can provide a wireless communications link (including optionally both voice and data) to one or more other communications terminals. Such radiotelephones are used in a variety of different applications, including cellular telephone, land-mobile (e.g., police and fire departments), and satellite communications systems.

Cellular telephone systems are commonly employed to provide voice and data communications to a plurality of subscribers within a prescribed geographic area. For example, analog cellular radiotelephone systems, such as those designated AMPS, ETACS, NMT-450, and NMT-900, have been deployed successfully throughout the world. Recently, digital cellular radiotelephone systems such as those designated IS-54B (and its successor IS-136) in North America and GSM in Europe have been introduced and are currently being deployed. These systems, and others, are described, for example, in the book entitled *Cellular Radio Systems,* by Balston, et al., published by Artech House, Norwood, Mass. (1993). In addition to the above systems, an evolving system referred to as Personal Communication Services (PCS) is being implemented. Examples of current PCS systems include those designated IS-95, PCS-1900, and PACS in North America, DCS-1800 and DECT in Europe, and PHS in Japan. These PCS systems operate at approximately the 2 gigahertz (GHz) band of the radio spectrum, and are typically being used for voice and high bit-rate data communications.

Many radiotelephones, and in particular handheld radiotelephones such as those typically used with cellular telephone systems, employ retractable antennas which may be extended out of, and retracted back into, the radiotelephone housing. Typically, such retractable antennas are electrically connected to a printed circuit board located within the housing of the radiotelephone that contains signal processing and other radio frequency circuitry. In order to maximize the transfer of power between the antenna and this radio frequency circuitry, the antenna and the radio frequency circuitry are typically interconnected such that the impedance of the antenna and the signal processing circuit are substantially matched. As many radiotelephones use 50 ohm impedance coaxial cable or microstrip transmission lines to connect the antenna to the radio frequency circuit, such matching typically comprises mechanically adjusting, electrically tuning or otherwise configuring the antenna so that it exhibits an impedance of approximately 50 ohms at its connection with the coaxial cable or microstrip transmission line.

Unfortunately, however, matching the impedance of a retractable antenna is more difficult, as the impedance exhibited by the antenna is generally dependent on the position of the antenna with respect to both the housing of the radiotelephone and the printed circuit board which contains the radio frequency circuitry. As these respective positions change when the antenna is moved between the extended and retracted positions, the antenna typically exhibits at least two different impedance states, both of which should be matched to the 50 ohm impedance of the feed from the printed circuit board. Accordingly, with retractable antennas, it is generally necessary to provide an impedance matching system that provides an acceptable impedance match between the antenna and the radio frequency circuitry both when the antenna is retracted and extended.

A number of different matching techniques are conventionally used with retractable antennas. For instance, many radiotelephones with retractable antennas employ dual impedance matching circuits, one of which is associated with the extended antenna position and the other with the retracted position. These matching systems typically comprise two or more resonant circuits and switches for switching between these circuits as a function of the position of the antenna. Other radiotelephones only provide a single matching circuit (which is switched in when the antenna is in the extended position), and operate without the benefit of any matching circuit when the antenna is in the retracted position. In other designs, a half-wavelength ($\lambda/2$) antenna may be used so that the antenna radiates as a half-wavelength structure in the extended position and as a quarter-wavelength ($\lambda/4$) antenna in the retracted position (as the retracted portion of the antenna does not radiate). With this arrangement, impedance matching is typically only required in the extended position, as the antenna may be designed to have a natural impedance reasonably close to 50 ohms in the retracted position. Still other radiotelephones use parasitic elements or printed transformer segments to match the impedance of the antenna to the radio frequency circuit board. However, each of the aforementioned techniques typically require some sort of matching means, which in turn requires space within the housing (or antenna) for matching components, and which additionally increases the overall cost of manufacturing the radiotelephone.

The aforementioned matching problems are further compounded in "dual-band" radiotelephones that are designed to transmit and receive signals in two or more widely separated frequency bands. In such phones, it is desirable to provide a single antenna structure that can operate in both bands. For example, a cellular telephone may operate in a conventional analog (AMPS) band at around 800 MHz and also in a PCS band at around 1900 MHz.

As the impedance seen at the base of the antenna is usually a function of frequency, antenna systems for such dual-band radiotelephones may provide separate matching networks for each of the two frequency bands of operation. Accordingly, if retractable antennas are used on such radiotelephones, it is often necessary to provide as many as four matching networks to ensure that an acceptable impedance match is achieved at each frequency of operation and each possible antenna position (i.e., extended or retracted).

Helix antennas provide an advantage over rod or monopole antennas in applications such as cellular telephones as they typically are shorter. This class of antenna refers to antennas which comprise a conducting member wound in a helical pattern. As the conducting member is wound about an axis, the axial length of a quarter-wavelength or half-wavelength helix antenna is considerably less than the length of a comparable quarter-wavelength monopole antenna, and thus helix antennas may often be employed where the length of a quarter-wavelength monopole antenna is prohibitive. Moreover, although a half-wavelength or a quarter-wavelength helix antenna is typically considerably shorter than its half-wavelength or quarter-wavelength monopole antenna counterpart, it may exhibit the same effective electrical length.

Several dual-band helix antenna systems have been proposed. For instance, U.S. Pat. No. 4,554,554 to Olesen et al. discusses a quadrifilar helix antenna which includes PIN diode switches along each of its elements to provide means for selectively resonating the antenna at one of two distinct frequencies by changing the electrical length of the elements.

Similarly, U.S. Pat. No. 4,494,122 to Garay et al. discusses an antenna system comprising an upper radiating element and a tank circuit which resonate at one frequency, and a helical element and associated sleeve member which resonate at a second frequency. While this apparatus is potentially shorter than a conventional sleeved dipole, it is still relatively large, and the usable operating bandwidth of the antenna about each resonant frequency is very small, such that this antenna system is not suitable for many potential dual-band applications such as cellular telephone.

U.S. Pat. No. 4,442,438 to Siwiak et al. discusses an antenna system comprising two quarter-wavelength helical antenna elements and a linear conductive member, which purportedly resonates at two different frequencies. However, the antenna disclosed in Siwiak et al. does not resonate at widely separated frequencies (the resonant frequencies disclosed were 827 MHz and 850 MHz), as the antenna is designed to broaden the antennas response to cover a single bandwidth of operation as opposed to providing for operation in two widely separated frequency bands.

Finally, additional helix antenna systems are disclosed in Japanese Patent No. 5-136623 and U.S. patent application Ser. No. 08/725,507, which discuss dual band operation through use of a conductive tube, and variable pitch windings, respectively. However, the mechanism for providing dual-band operation used in both these approaches, namely coupling between adjacent windings on the helix, typically results in a narrow operating bandwidth in the higher of the frequency bands and further may provide only limited design flexibility. Moreover, the antenna discussed in Japanese Patent No. 5-136623 also has a reduced effective aperture in the higher of the frequency bands.

Thus, in light of the above-mentioned demand for dual-band radiotelephones and the problems with current antenna systems for such radiotelephones, a need exists for radiotelephones with antenna systems that provide for good impedence matching in both the retracted and extended position for use in both bands of dual-band operation.

SUMMARY OF THE INVENTION

In view of the above limitations associated with existing retractable antenna systems for radiotelephones, it is an object of the present invention to provide retractable antenna systems with improved performance in both a high and a low frequency band.

Another object of the present invention is to provide retractable antenna systems which are conveniently small and which minimize the amount of radio frequency circuitry required while still providing for impedance matching in both a high and a low frequency band.

These and other objects of the present invention are provided by retractable antenna systems which comprise a helix antenna coupled to an extendible rod antenna. When the rod antenna is in the retracted position, the rod antenna is mostly, or completely, located within the housing of the radiotelephone, whereas when the radiotelephone operates with the rod antenna in the extended position, most, or all, of the rod antenna is pulled outside of the housing, thereby extending the helix antenna well away from the body of the radiotelephone. The antennas are configured to provide a ¼ wavelength electrical length when retracted and a ½ wavelength electrical length when extended in the low frequency (such as AMPS) band. A matching circuit is provided using known techniques to provide a selected impedence in the extended position. The tap point where the rod antenna is connected to the helix antenna is at a position intermediate its ends, which position is selected to provide a desired impedance in the high frequency (such as PCS) band. As the tap position has a significantly greater effect on the electrical characteristics of the antenna in the high frequency band, the antenna of the present invention may be configured to exhibit approximately the same impedance in both the extended and retracted positions for both the high and low frequency bands, and, thus, the antenna systems of the present invention reduce or eliminate the need for additional impedance matching components.

In one embodiment of the present invention a radiotelephone having a retractable antenna system is provided including a housing and a transceiver disposed within the housing. A rod antenna is movably mounted within the housing and extendible from the housing so as to have an extended position and a retracted position. A helix antenna is provided having a first end and a second end. The helix antenna is connected to the rod antenna at a tap point intermediate the first end and the second end. A connection means electrically couples the transceiver to the rod antenna.

In a further embodiment of the present invention, the radiotelephone is a dual-band radiotelephone operating at a lower band and a higher band and the tap point is positioned to provide a selected impedance match at the higher band. The rod antenna and the helix antenna may provide a substantially ½-wavelength radiating element at a center frequency of the lower band when the rod antenna is in the extended position. The rod antenna itself may be substantially a ¼ wavelength radiating element at a center frequency of the lower band. Furthermore, the selected impedence may be substantially optimized for operation at the higher band.

In another embodiment of the present invention, the helix antenna is physically supported by the rod antenna. The helix antenna may be extended by slidably moving the rod antenna from the housing of the radiotelephone and the helix antenna is preferably substantially isolated from the housing of the radiotelephone when the rod antenna is in the extended position.

In a further aspect of the present invention, the connection means further provides means for electrically coupling the transceiver to the rod antenna and for causing the helix antenna to act as a dual band radiator when the rod antenna is in the retracted position. The connection means may include a parasitic element positioned adjacent the helix antenna. The helix antenna may also be wound in a non-uniform pitch.

In another embodiment of the present invention, a retractable dual-band antenna system for a radiotelephone having a housing and a transceiver is provided. The antenna system includes a dual-band antenna electrically coupled to the transceiver and configured so as to selectively radiate in both a higher and a lower frequency band. The dual-band antenna including a rod antenna movably mounted within the housing and extendible from the housing so as to have an extended position and a retracted position and a helix antenna having a first end and a second end and being electrically coupled to the rod antenna at a tap point intermediate the first end and the second end.

In a further aspect of the present invention a method is provided for designing a dual band retractable antenna for operation at a lower frequency band and an upper frequency band. A helix antenna having a first end and a second end is selected and a rod antenna is selected. An impedence matching circuit is designed for operations at the lower frequency band when the retractable antenna is in an extended position. Finally, a tap point is selected for electrically coupling the rod antenna to the helix antenna at a position intermediate the first end and the second end of the helix antenna.

Accordingly, the present invention provides dual-band radiotelephones and antenna systems providing improved performance for dual-band operations without the need for additional impedance matching circuits. The present invention provides this benefit based on the inventors' discovery that an intermediate tap point electrically coupling the helix antenna and the rod antenna may be selected to optimize the impedence of the antenna system at the high frequency band without substantially affecting its impedence at the low frequency band.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Additionally, it will be understood by those of skill in the art that the present invention may be advantageously used in a variety of applications, and thus the present invention should not be construed as limited in any way to the example applications described herein. Like numbers refer to like elements throughout.

Figure 1:
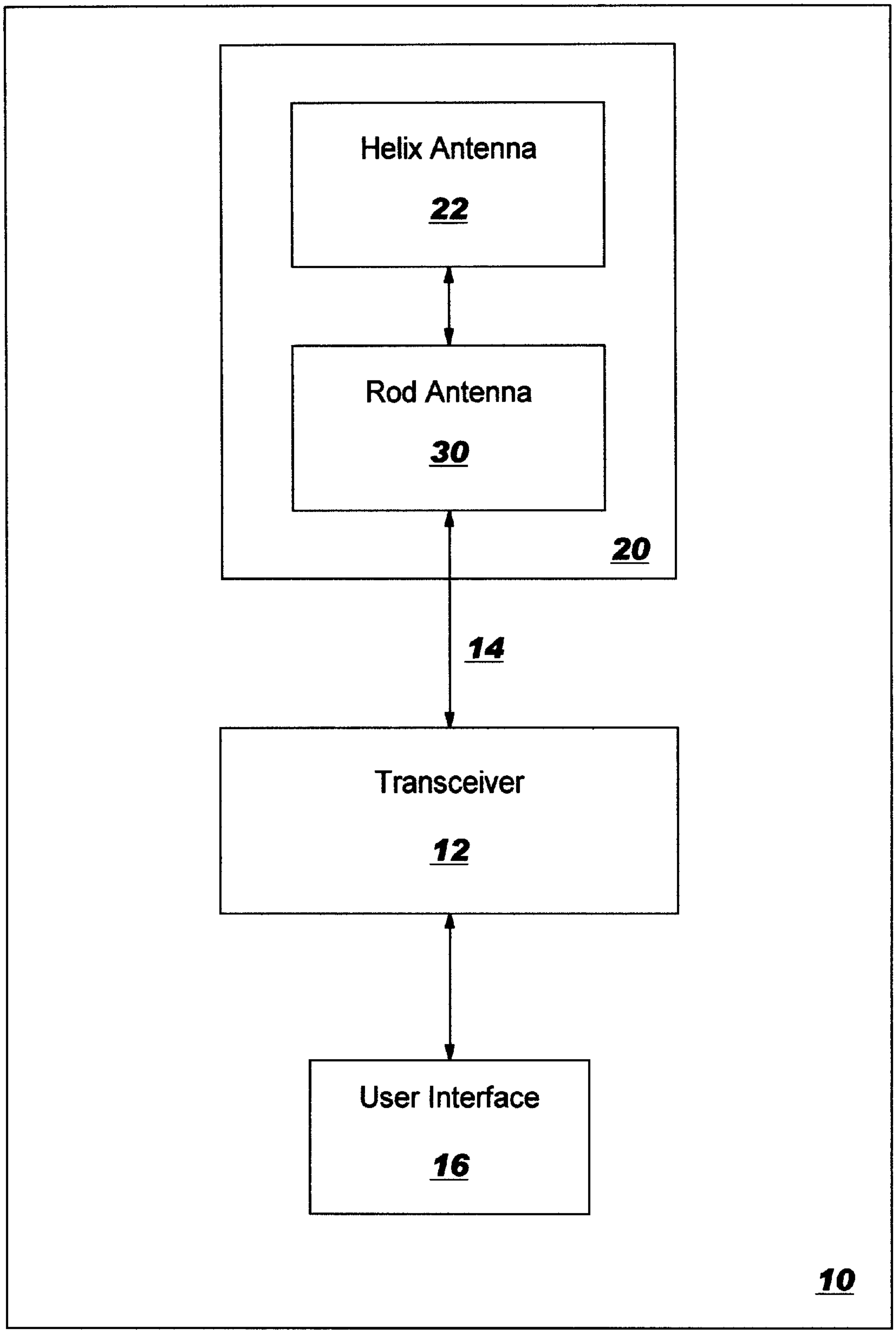
FIG. 1 is a block diagram of a radiotelephone which includes a retractable dual-band antenna system according to the present invention.

An embodiment of a radiotelephone 10 which includes a retractable antenna system 20 according to the present invention is illustrated in FIG. 1. Radiotelephone 10 may comprise any type of dual-band wireless radio voice or data communications terminal, such as, for example, an AMPS/PCS communications terminal. Accordingly, radiotelephone 10 operates at a lower frequency band (such as AMPS) and a higher frequency band (such as PCS).

As shown in FIG. 1, radiotelephone 10 according to the illustrated embodiment of the present invention includes a transceiver 12, a user interface 16 and an antenna feed 14. As is well known to those of skill in the art, transceiver 12 facilitates the radio frequency transmission of information by converting information which is to be transmitted into electromagnetic signals suitable for radio communications. Transceiver 12 also may be used to demodulate electromagnetic signals which are received by radiotelephone 10, thereby providing the information contained in the signals to user interface 16. Transceiver 12 is coupled to retractable antenna system 20 through antenna feed 14. Antenna feed 14 may be provided by a variety of known means such as a microstrip, coaxial cable or stripline. Transceivers 12 and user interfaces 16 (e.g., microphones, keypads, rotary dials) which are suitable for use with radiotelephones 10 are known to those of skill in the art, and will not be described further herein.

As illustrated in FIG. 1, retractable antenna system 20 includes a helix antenna 22 and a rod antenna 30. In one embodiment of the present invention, antenna feed 14 is coupled to extendible rod antenna 30 which in turn is coupled to helix antenna 22. Rod antenna 30 is electrically coupled to helix antenna 22 at a tap point 36 (FIG. 2) and both rod antenna 30 and helix antenna 22 propogate electromagnetic energy from transceiver 12 when radiotelephone 10 is transmitting a communications signal. Helix antenna 22 may a dual-band helix antenna, implemented, for example, as concentric helix antennas or as a helix antenna with a parasitic element. Rod antenna 30 is preferably a monopole antenna.

Figure 2:
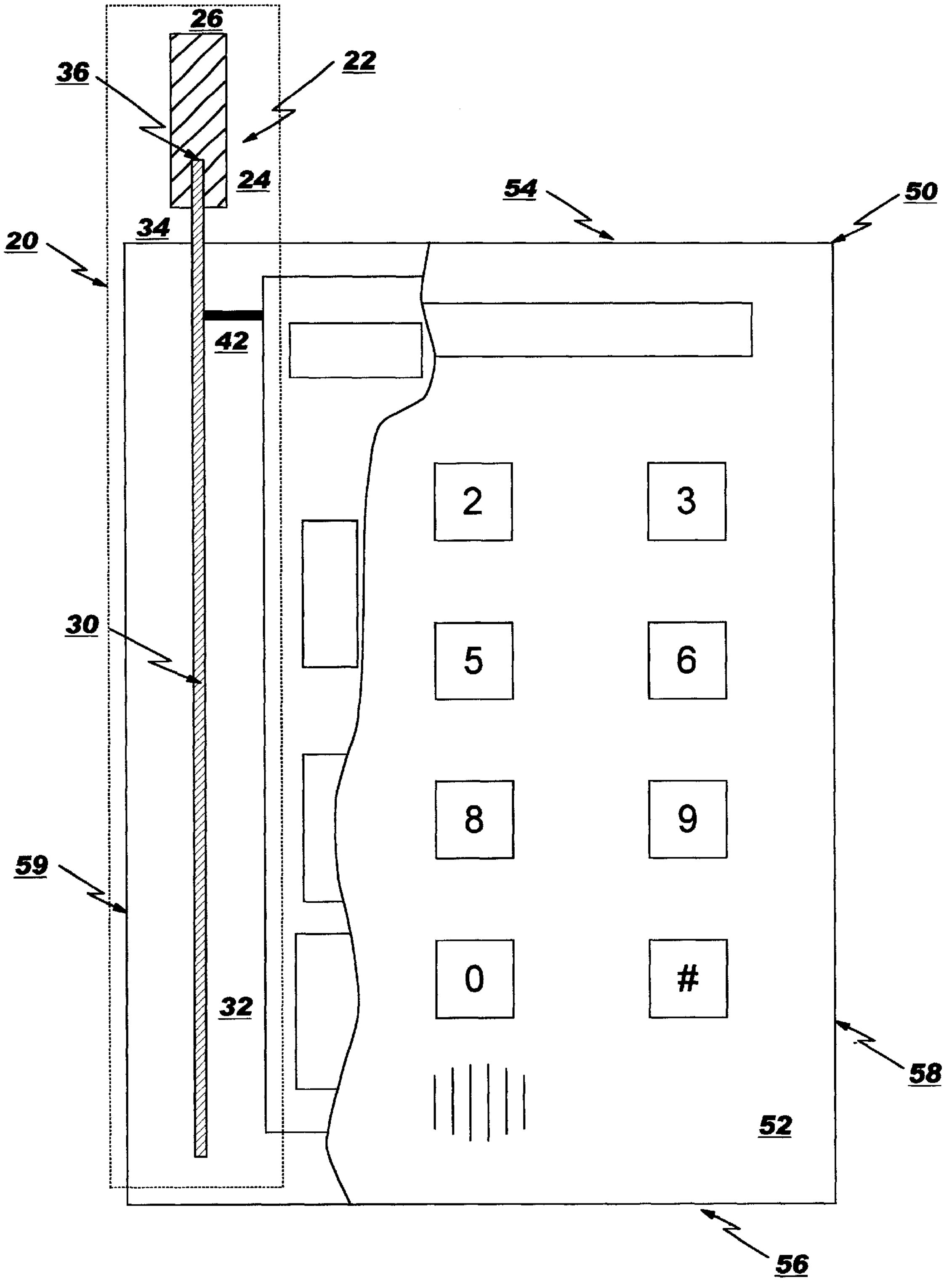
FIG. 2 illustrates an embodiment of the retractable antenna system of the present invention with the antenna in the retracted position.
Figure 3:
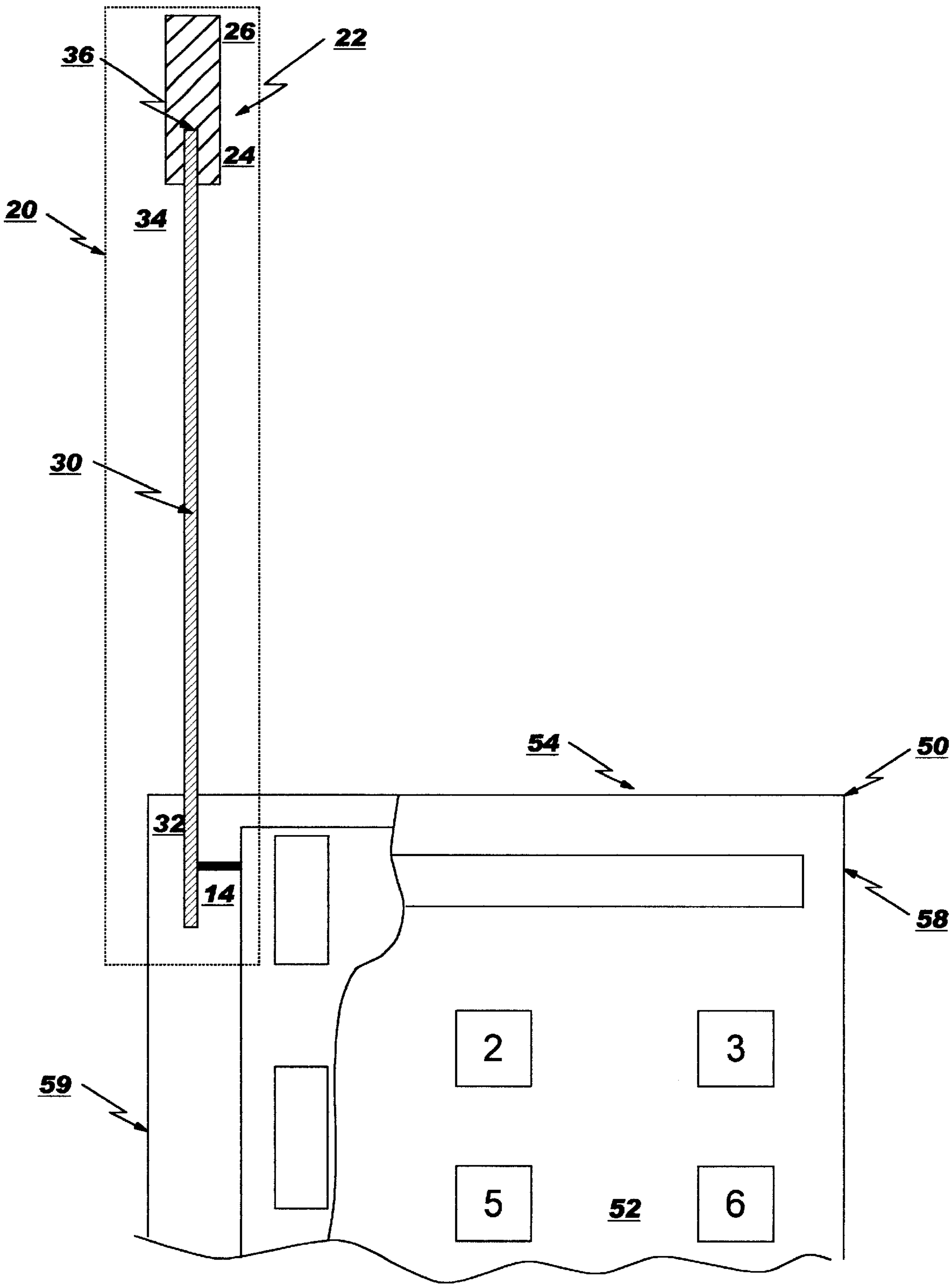
FIG. 3 illustrates the embodiment of FIG. 2 with the antenna in the extended position.

FIGS. 2 and 3 depict an embodiment of the retractable antenna system 20 of the present invention, with FIG. 2 illustrating the antenna in the retracted position and FIG. 3 depicting the antenna in the extended position. As shown in FIG. 2, radiotelephone 10 includes a housing 50 which includes a front face 52, a top face 54, a bottom face 56 and side faces 58, 59. In the illustrated embodiment, antenna system 20 is generally mounted within housing 50 along the vertical axis extending between top face 54 and bottom face 56 and positioned adjacent to one of the side faces 58, 59. However, as shown in both FIGS. 2 and 3, portions of antenna system 20 may extend outside of housing 50.

As is illustrated in FIGS. 2 and 3, antenna system 20 primarily comprises a helix antenna 22 and an extendible rod antenna 30 which is electrically coupled to helix antenna 22. By "extendible" it is meant that rod antenna 30 may be slidably moved into and out of housing 50, so as to vary the length of antenna system 20 which extends external to housing 50 of radiotelephone 10. Herein, the terms "extended position" and/or "extended state" refer to the situation illustrated in FIG. 3, where rod antenna 30 is mostly or completely extended out of housing 50, thereby extending helix antenna 22 some distance from housing 50. Conversely, as used herein the terms "retracted position" and/or "retracted state" refer to the situation illustrated in FIG. 2, where rod antenna 30 is mostly or completely recessed within housing 50.

In the illustrated embodiment of the present invention, rod antenna 30 has a base 32 and a distal end 34. When helix antenna 22 is in the retracted position, base 32 of rod antenna 30 is located adjacent the bottom face 56 of housing 50, and distal end 34 of rod antenna 30 is located adjacent the top face 54. As is illustrated in FIG. 3, when helix antenna 22 is in the extended position, base 32 is adjacent the top face 54 of housing 50, and distal end 34 is external to and displaced from housing 50.

In the embodiment depicted in FIGS. 2 and 3, rod antenna 30 is slidably movable along a vertical axis which runs both within, and external to, housing 50. As illustrated in FIG. 3, when helix antenna 22 is in the extended position, rod antenna 30 is extended so that it is nearly completely external to housing 50. Helix antenna 22 is thereby substantially isolated from the housing 50. Conversely, as illustrated in FIG. 2, when helix antenna 22 is in the retracted position, rod antenna 30 is located almost completely within housing 50, so that helix antenna 22 appears as a conventionally mounted (i.e., non-retractable) antenna when retracted.

In the embodiment illustrated in FIGS. 2 and 3, helix antenna 22 remains external to housing 50 in both the extended and retracted positions. However, as will be understood by those of skill in the art, helix antenna 22 may be physically retracted so as to be positioned partially or even completely within housing 50 when the antenna is in its retracted position and it will still be possible to practice the teachings of the present invention. However, as will also be understood by those of skill in the art, improved performance will typically be achieved where helix antenna 22 remains external to housing 50 in both the extended and retracted positions, as coupling between the helix antenna 22 and housing 50 may alter the electrical length of the antenna in the event that the helix antenna 22 is retracted within the housing 50 of radiotelephone 10.

As is shown in the block diagram of FIG. 1, rod antenna 30 is coupled to transceiver 12 by antenna feed 14. While not illustrated herein, multiple connections between rod antenna 30 and transceiver 12 may be provided as part of known impedence matching techniques for retractable antennas. For example, in the illustrated embodiment of FIGS. 2 and 3, a second, alternate, connection point could be provided adjacent bottom face 56 which would only connect to rod antenna 30 in the retracted position. This structure allows the antenna system 20 to be excited at the base of the helix antenna 22 (or the top of rod antenna 30 adjacent helix antenna 22) or at a selected point on the rod antenna 30 in the retracted position. This capability complements the impedence matching techniques discussed further herein such as use of a parasitic element.

Helix antenna 22 also includes a bottom or first end 24 and a top or second end 26. Helix antenna 22 is connected to rod antenna 30 at a tap point 36 intermediate bottom end 24 and top end 26. As will be described further herein, the tap point 36 is positioned intermediate the two ends to provide a selected impedence match at the higher frequency band.

Preferably, rod antenna 30 and helix antenna 22 provide a substantially ½ wavelength (λ/2) radiating element at the lower band when antenna system 20 is in the extended position and a substantially ¼ wavelength (λ/4) radiating element in the retracted position. Typically the design is based on the center frequency of the respective frequency band. This type of structure is known for single band antennas where each element (rod and helix) of antenna system 20 is designed as a ¼ wavelength and the rod antenna is connected to the base end of the helical antenna structure. The rod antenna is normally coupled so as to not act as a radiating element when retracted. For dual band antennas, it is desired to provide a substantially ½ wavelength electrical length at the higher band (as contrasted with the present inventions design for the lower band) when extended and ¼ wavelength when retracted for the higher band. However, with this design, the antenna provides a ¼ wavelength electrical length retracted for the lower band which, therefore, is greater than a ¼ wavelength at the higher band. This may cause radiation performance to be degraded.

Accordingly, the present invention provides a dual band antenna system wherein electrical lengths of the individual (rod and helix) elements of the antenna system 20 are chosen to provide ¼ wavelength each (½ wavelength combined) for the lower frequency band of operation. While this alone provides good performance in the lower band, it typically provides poor performance in the extended state for the higher band as, in the extended position the electrical length of the combined antenna would typically appear to be significantly greater than ½ wavelength.

According to the present invention, this mismatch is compensated for by using the helical antenna structure 22 as a distributed tuning element for antenna system 20 when it is extended. Tap point 36 is positioned to substantially optimize operation at the higher band, particularly in the extended position. By connecting rod antenna 30 to helix antenna 22 at a location other than bottom end 24 (i.e. at an intermediate position) a better impedence match at the higher band of operation is obtained. At the lower band of operation, the inventors have found that the current distribution along antenna system 20 remains relatively unaffected. Therefore, a ½ wavelength radiating element is maintained at the lower band substantially independent of the position of the tap point 36. At the higher band of operation, tap point 36 is positioned to tune-out at least some of the effects of the helix.

It is to be understand that the resulting structure typically may not provide precisely the desired ½ and ¼ wavelength structures in both bands as the lower band response may be somewhat affected by the tap point. However, for purposes of obtaining the desired performance, a substantially ½ and ¼ wavelength structure is provided suitable for use with known dual band systems such as AMPS/PCS. Helix antenna 22, in the illustrated embodiment, may also be physically supported by rod antenna 30.

In various embodiments of the present invention, antenna feed 14 may be configured in combination with transceiver 12 so that helix antenna 22 acts as a dual band radiator when antenna system 20 is in the retracted position. Furthermore, other known techniques for making a helix antenna operate as a dual band radiator when in the retracted state may be included such as positioning a parasitic element adjacent helix antenna 22 or selecting a helix wound in a non-uniform pitch for helix antenna 22. An impedence matching circuit may also be incorporated between antenna feed 14 and transceiver 12.

As discussed above, in one embodiment of the present invention, helix antenna 22 is implemented as a quarter-wavelength helix with a natural impedance on the order of 50 ohms at the low frequency (or AMPS) band. In this manner, helix antenna 22 may be inherently matched to the, typically, 50 ohm interface 14 used to couple transceiver 12 to antenna system 20. Accordingly, pursuant to the teachings of the present invention, it is possible to match the impedance of helix antenna 22 in both the extended and retracted positions, without the need for separate matching components for each band of operation. A matching circuit, such as a series capacitor with a shunt inductor, may still be provided for use, preferably only in the extended position, in one or both frequency bands. This is preferable to conventional dual band radiotelephones which may require as many as four separate matching circuits to match the antenna to the feed in both the extended and retracted positions (i.e. separate matching networks are required for each frequency band in which the antenna operates.

Figure 4:
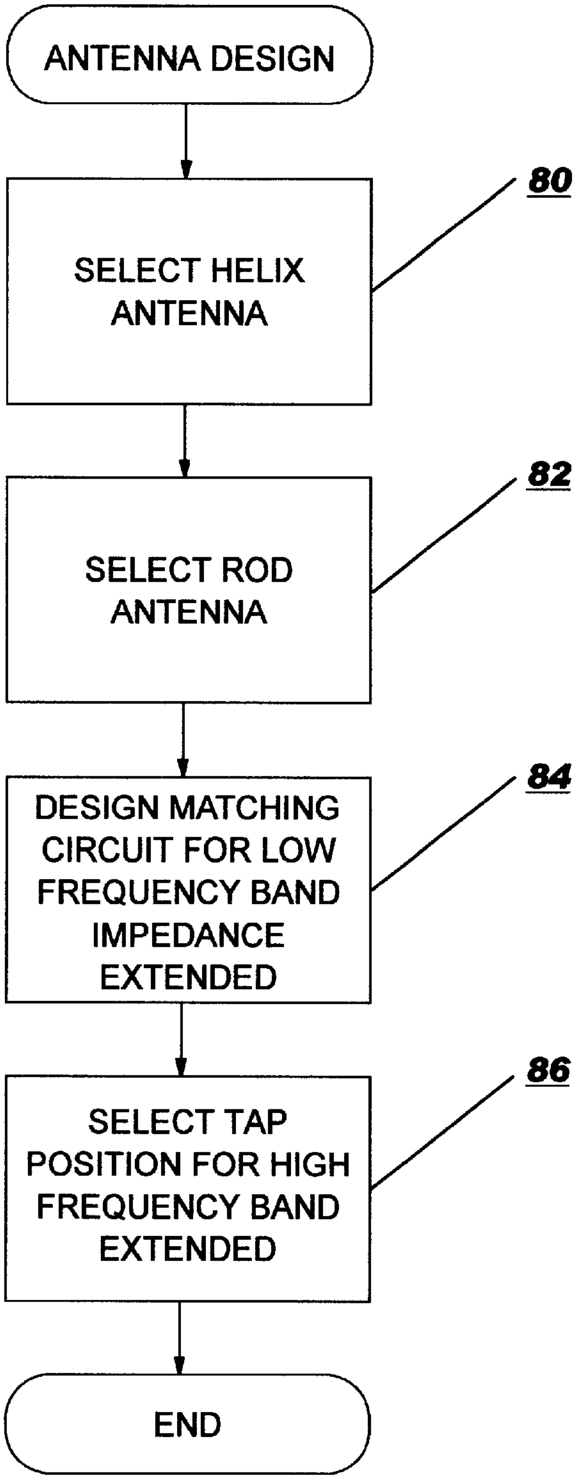
FIG. 4 is a flow chart illustrating a methodology for designing antenna systems according to the present invention.

In another aspect of the present invention, methods of designing antenna system 20 are disclosed. An embodiment of these methodologies is depicted in FIG. 4. As illustrated in FIG. 4, the helix antenna 22 is first designed in isolation (block 80). Typically, the characteristics of helix antenna 22 are chosen based on the required gain performance of the antenna, antenna size and cost considerations, and the impedance of the associated antenna feed. Next (block 82), the rod antenna is selected, typically to provide the desired wavelength at the lower band of operation. A matching circuit may be designed (block 84) to compensate for differences in the retracted and extended positions at the lower band of operation. The matching circuit will typically be in the circuit only in the extended state. Finally (block 86) the tap position is selected to obtain the desired matched impedence (typically 50 ohms) at the higher band of operation in the extended state. The tap position is preferably selected by simple trial and error iterative techniques. In the event further compromise is required to meet impedance match specifications, performance is preferably optimized in the extended position at the expense of performance in the retracted position.

An example of an antenna system according to the present invention for operation in the 824 MHz to 894 MHz AMPS frequency band and in the 1850 MHz to 1990 MHz PCS frequency band will now be provided. A rod antenna of length 89 millimeters is provided. The rod antenna is connected to a 30 millimeter helix antenna at an intermediate point 5 millimeters from the bottom end of the helix antenna. The resulting structure provides a 2.5 to 1 Voltage Standing Wave Ratio (VSWR) at the AMPS band and a 2.0 to 1 VSWR at the PCS band.

In the drawings, specification and examples, there have been disclosed typical preferred embodiments of the invention and, although specific terms are employed, these terms are used in a generic and descriptive sense only and not for purposes of limitation, the scope of the invention being set forth in the following claims. Accordingly, those of skill in the art will themselves be able to conceive of embodiments of the retractable antenna systems and radiotelephones other than those explicitly described herein without going beyond the scope of the present invention.

That which is claimed is:

1. A dual-band radiotelephone operating at a lower band and a higher band and having a retractable antenna system comprising:

a housing;

a transceiver disposed within said housing;

a rod antenna movably mounted within said housing and extendible from said housing so as to have an extended position and a retracted position;

a helix antenna having a first end and a second end, the helix antenna being connected to the rod antenna at a tap point intermediate the first end and the second end, the tap point being positioned to provide a selected impedance match at the higher band; and connection means for electrically coupling the transceiver to the rod antenna.

2. The radiotelephone of claim 1 wherein the rod antenna and the helix antenna provide a substantially ½-wavelength radiating element at a center frequency of the lower band when the rod antenna is in the extended position.

3. The radiotelephone of claim 1 wherein the selected impedance is substantially optimized for operation at the higher band.

4. The radiotelephone of claim 1, wherein the helix antenna is physically supported by the rod antenna.

5. The radiotelephone of claim 4, wherein the helix antenna is extended by slidably moving the rod antenna from the housing of said radiotelephone.

6. The radiotelephone of claim 5, wherein said helix antenna is substantially isolated from the housing of the radiotelephone when the rod antenna is in the extended position.

7. The radiotelephone of claim 1, wherein the connection means further comprises means for electrically coupling the transceiver to the rod antenna and for causing the helix antenna to act as a dual band radiator when the rod antenna is in the retracted position.

8. The radiotelephone of claim 7, wherein the connection means for electrically coupling the transceiver to the rod antenna includes a parasitic element positioned adjacent the helix antenna.

9. The radiotelephone of claim 7, wherein the helix antenna is wound in a non-uniform pitch.

10. The radiotelephone of claim 1, wherein the rod antenna is substantially a ¼ wavelength radiating element at a center frequency of the lower band.

11. A retractable dual-band antenna system for a radiotelephone having a housing and a transceiver, comprising:

a dual-band antenna electrically coupled to the transceiver and configured so as to selectively radiate in both a higher and a lower frequency band, said dual-band antenna including:

a rod antenna movably mounted within the housing and extendible from the housing so as to have an extended position and a retracted position; and a helix antenna having a first end and a second end and being electrically coupled to the rod antenna at a tap point intermediate the first end and the second end, the tap point being positioned to provide a selected impedance match at the higher frequency band.

12. The antenna system of claim 11 wherein the rod antenna and the helix antenna provide a substantially ½-wavelength radiating element at a center frequency of the lower frequency band when the rod antenna is in the extended position.

13. The antenna system of claim 11 wherein the selected impedance is substantially optimized for operation at the higher frequency band.

14. The antenna system of claim 11, wherein the helix antenna is physically supported by the rod antenna.

15. The antenna system of claim 14, wherein the helix antenna is extended by slidably moving the rod antenna from the housing of said radiotelephone.

16. The antenna system of claim 15, wherein said helix antenna is substantially isolated from the housing of the radiotelephone when the rod antenna is in the extended position.

17. The antenna system of claim 11, further comprising connection means for electrically coupling the transceiver to the rod antenna and for causing the helix antenna to act as a dual band radiator when the rod antenna is in the retracted position.

18. The antenna system of claim 17, wherein the connection means for electrically coupling the transceiver to the rod antenna includes a parasitic element positioned adjacent the helix antenna.

19. The antenna system of claim 17, wherein the helix antenna is wound in a non-uniform pitch.

20. The antenna system of claim 11, wherein the rod antenna is substantially a ¼ wavelength radiating element at a center frequency of the lower frequency band.

21. A method for designing a dual band retractable antenna for operation at a lower frequency band and an upper frequency band comprising the steps of:

selecting a helix antenna having a first end and a second end;

selecting a rod antenna;

designing an impedance matching circuit for operations at the lower frequency band when the retractable antenna is in an extended position; and selecting a tap point for electrically coupling the rod antenna to the helix antenna at a position intermediate the first end and the second end of the helix antenna, the position being selected to provide a selected impedance match at the higher frequency band so as to enable the helix antenna to operate as a distributed tuning element for the dual band retractable antenna in the extended position.

22. The method of claim 21 wherein selecting a rod antenna further comprises selecting a rod antenna which is substantially a ¼ wavelength radiating element at a center frequency of the lower frequency band and wherein selecting a helix antenna having a first end and a second end further comprises selecting a helix antenna which in combination with the rod antenna is substantially a ½ wavelength radiating element at a center frequency of the lower frequency band when the rod antenna is in the extended position.

23. A dual-band radiotelephone operating at a lower band and a higher band and having a retractable antenna system comprising:

a housing;

a transceiver disposed within said housing;

a rod antenna movably mounted within said housing and extendible from said housing so as to have an extended position and a retracted position;

a helix antenna having a first end and a second end, the helix antenna being connected to the rod antenna at a tap point intermediate the first end and the second end, the tap point being positioned to provide a selected impedance match at the higher band; and an antenna feed positioned to electrically couple the transceiver to the rod antenna.

24. The radiotelephone of claim 23 wherein the rod antenna and the helix antenna provide a substantially ½-wavelength radiating element at a center frequency of the lower band when the rod antenna is in the extended position.

25. The radiotelephone of claim 23 wherein the selected impedance is substantially optimized for operation at the higher band.

26. The radiotelephone of claim 23, wherein the helix antenna is physically supported by the rod antenna.

27. The radiotelephone of claim 23 wherein the antenna feed is selected from the group consisting of a microstrip, a coaxial cable or a stripline.

28. The radiotelephone of claim 23 wherein the lower band is the AMPS frequency band and the higher band is the PCS frequency band and wherein the rod antenna has a length of about 89 millimeters and the helix antenna comprises about a 30 millimeter helix antenna and the rod antenna is connected to the helix antenna at the tap point about 5 millimeters from the first end of the helix antenna.

* * * * *